United States Patent
Lee et al.

(10) Patent No.: US 10,123,274 B2
(45) Date of Patent: Nov. 6, 2018

(54) MULTI-CHANNEL LOW POWER COMMUNICATION METHOD AND APPARATUS

(71) Applicant: ELECTRONICS AND TELECOMMUNICATIONS RESEARCH INSTITUTE, Daejeon (KR)

(72) Inventors: Il Gu Lee, Gwangmyeong (KR); Jung Bo Son, Daejeon (KR); Hee Soo Lee, Daejeon (KR); Sok Kyu Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/247,596

(22) Filed: Aug. 25, 2016

(65) Prior Publication Data

US 2016/0366647 A1 Dec. 15, 2016

Related U.S. Application Data

(63) Continuation of application No. 14/487,003, filed on Sep. 15, 2014, now Pat. No. 9,456,418.

(30) Foreign Application Priority Data

Oct. 14, 2013 (KR) .................. 10-2013-0121916

(51) Int. Cl.
*H04W 52/02* (2009.01)
*H04W 74/08* (2009.01)

(52) U.S. Cl.
CPC ... *H04W 52/0235* (2013.01); *H04W 74/0816* (2013.01); *Y02D 70/00* (2018.01); *Y02D 70/142* (2018.01)

(58) Field of Classification Search
CPC ......... H04W 52/0209; H04W 52/0235; H04W 74/0816
See application file for complete search history.

(56) References Cited

U.S. PATENT DOCUMENTS 7,796,632 B2 * 9/2010 Hasty .................. H04L 1/0002 370/431
9,456,418 B2 * 9/2016 Lee .................. H04W 52/0235
(Continued)

FOREIGN PATENT DOCUMENTS

EP 2 357 773 A2 8/2011
JP 2007-166373 A 6/2007
(Continued)

*Primary Examiner* — Benjamin H Elliott, IV

(57) ABSTRACT

A multi-channel low power communication method and apparatus are provided. The multi-channel low power communication method may include transmitting request to send (RTS) to a receiver through a plurality of communication channels, receiving clear to send (CTS) from the receiver in response to the RTS, and transmitting a data packet through part or entire of at least one communication channel having received the CTS among the plurality of communication channels, wherein at least one of the RTS and the CTS comprises a multi-channel power save information field related to multi-channel power save.

6 Claims, 24 Drawing Sheets

(56) References Cited

U.S. PATENT DOCUMENTS

| | | | |
|---|---|---|---|
| 2008/0018427 A1* | 1/2008 | Ezra | H04L 1/22 340/7.32 |
| 2011/0096685 A1* | 4/2011 | Lee | H04L 27/0012 370/252 |
| 2012/0063397 A1* | 3/2012 | Abedi | H04W 74/00 370/329 |
| 2012/0163360 A1* | 6/2012 | Cheong | H04W 48/16 370/338 |
| 2012/0207036 A1* | 8/2012 | Ong | H04W 74/0816 370/252 |
| 2012/0213177 A1* | 8/2012 | Lee | H04W 52/0216 370/329 |
| 2016/0286551 A1* | 9/2016 | Lee | H04L 27/26 |
| 2016/0366647 A1* | 12/2016 | Lee | H04W 52/0235 |

FOREIGN PATENT DOCUMENTS

| | | |
|---|---|---|
| JP | 2013-509784 A | 3/2013 |
| KR | 10-2009-0061564 A | 6/2009 |
| KR | 10-2009-0131398 A | 12/2009 |
| WO | WO 2011/053026 A2 | 5/2011 |

* cited by examiner

MULTI-CHANNEL LOW POWER COMMUNICATION METHOD AND APPARATUS

CROSS-REFERENCE TO RELATED APPLICATION

This application is a continuation of and claims priority to U.S. application Ser. No. 14/487,003 filed Sep. 15, 2014, which claims the benefit of Korean Patent Application No. 10-2013-0121916, filed on Oct. 14, 2013, in the Korean Intellectual Property Office, the disclosures of which are incorporated herein by reference.

BACKGROUND

1. Field of the Invention

The present invention relates to a multi-channel low power communication method and apparatus.

2. Description of the Related Art

As smart devices are popularized, users of the mobile internet are continuously increasing. With an increase in real time traffic such as high capacity multimedia, for example sound, image, and the like, a bandwidth and speed of a network device for accepting the traffic are also increasing. With rapid spread of high performance intelligent mobile terminals, demands of the users are continuously diversified and increased.

However, energy consumption is increasing in proportion to a performance increase of the network device. Since wireless communication devices equipped with a high communication technology use a strong processor, an affluent memory, a wide screen, and an open operation system (OS), an energy budget of a wireless communication interface with a limited battery capacity should be extremely limited. Wireless communication systems are rapidly developing to accept additional elements and technologies to add new functions and increase the performance. However, development in a battery size and a battery capacity is relatively slow. Accordingly, in regard to the wireless communication systems, there is a desire for a method for using the limited battery capacity longer and more efficiently.

Due to a limited power capacity of a wireless communication mobile terminal, a research for reducing the energy consumption is actively conducted. In particular, it is known that, in mobile devices such as a smart phone, a tablet, a notebook, and a sensor, most of energy is inefficiently consumed in the wireless communication interface.

Since the battery capacity is limited in the mobile terminal or the sensor, a technology for minimizing energy consumption is necessary. In a mobile node, most of energy is consumed in a central processor unit (CPU) and the wireless communication interface. The CPU may reduce energy consumption by variably controlling a clock frequency and a voltage supply according to a load to be processed and requirements of an application program. That is, the CPU may be operated at a low frequency and a low voltage if possible, or the operation may be suspended until the task is generated when a task to be processed is absent.

A wireless interface may reduce power consumption by two methods as follows.

1) The wireless interface is awake only when there is data to be exchanged with another wireless device. Otherwise, a power save mode is maintained to reduce energy consumption.

2) When a received packet does not correspond to an identifier (ID) of the wireless interface, data processing is not performed to reduce energy consumption.

3) According to the above technologies 1) and 2), the efficiency may be deteriorated since an environment and condition provided to the mobile node are not taken into consideration. Therefore, the conventional wireless modem physical layer has reduced energy consumption by setting an operation frequency to be low, by minimizing a voltage supply or decreasing complexity, and by variably controlling the clock frequency and the voltage supply according to a load to be processed.

However, reduction in the operation frequency, the voltage supply, and the complexity is limited with a conventional semiconductor processing technology. Since those three factors are in trade-off relationships with the performance, meeting of performance requirements of the system is limited.

Unsatisfactory energy efficiency, interference, coverage, transmission capacity, unstable transmission rate, and the like are typical limits of a wireless local area network (WLAN) technology. According to a spread of smart devices equipped with a WLAN chip, a great number of access points (AP) are being used. However, an actual increase in performance is not meeting expectation due to signal collision caused by overlap of a service area between APs and a hidden node problem.

In particular, since the WLAN is required to perform high speed digital processing to support a high performance service, a high frequency clock is used and a great hardware size is required. In addition, since a relatively high voltage is used, power consumption is extremely high.

A power saving protocol of a medium access control (MAC) level introduced to overcome the high power consumption defines a sleep mode. When there is no packet to be exchanged, the WLAN is converted into the sleep mode to interrupt an unnecessary clock or voltage supply of the circuit, thereby reducing the power consumption. In a MAC layer, the energy consumption may be reduced by a method that keeps an awake state only when there is data to be exchanged with another wireless device using a separate control signal periodically exchanged and maintains a power save mode when there is no data to be exchanged.

Here, the control signal may have a relatively long time period due to interrupt processing of MAC layer hardware and software. Due to the trade off relationships between the performance, for example a service quality including throughput and delay, and the power consumption, use of the power save mode of the MAC layer is limited.

Furthermore, in an active mode, not the sleep mode, a reception standby mode needs to be maintained since a packet receiving time is unknown. Even when a packet is received, whether the received packet is to be received by a corresponding terminal and whether recovery of the packet will succeed are not guaranteed. Therefore, reduction in the power consumption is limited with the conventional technology.

SUMMARY

Through embodiments of the present invention, in a wireless communication apparatus supporting a multi-channel, power consumption may be reduced by controlling a transmission method based on power consumption efficiency of a hardware resource, a channel environment, and battery information.

Basically, power consumption in a wireless communication apparatus increases in proportion to the hardware resource and an operation frequency. The power consumption also increases according to an increase in a frequency band simultaneously by the wireless communication apparatus. Use in the hardware resource increases according to an increase in a non-adjacent band performing non-adjacent channel carrier aggregation.

An aspect of the present invention provides a battery-limited wireless communication apparatus capable of increasing a battery lifetime by controlling the transmission method based on the power consumption efficiency, the channel environment, and the battery information.

According to an aspect of the present invention, there is provided a multi-channel low power communication method including transmitting a request frame, for example request to send (RTS), to a receiver through a plurality of communication channels, receiving a response frame, for example clear to send (CTS), from the receiver in response to the RTS, and transmitting a data packet through part or entire of at least one communication channel having received the CTS among the plurality of communication channels.

The transmitting of the data packet may include bonding the at least one communication channel having received the CTS among the plurality of communication channels, and transmitting the data packet through the bonded communication channel.

At least one of the RTS and the CTS may include a multi-channel power save information field related to multi-channel power save.

The multi-channel power save information field may include a multi-channel power save information field comprising at least one of whether a multi-channel power save mode is supported and a category of the multi-channel power save mode, a band information field related to an adjacent channel and a non-adjacent channel, an identifier (ID) information field comprising destination information of the data packet, and a lifetime information field comprising at least one of a remaining lifetime of the transmitter and a remaining battery time.

The multi-channel power save mode category may include information on which is recommended between an adjacent channel bonding transmission method and a non-adjacent channel carrier aggregation transmission method, information on selection of a channel according to a channel state, and information on selection of a channel according to a battery state.

The ID information may include a plurality of pieces of destination information, each of which relates to a destination of each of the plurality of communication channels.

The data packet may not be transmitted through a communication channel having not received the CTS among the plurality of communication channels.

The transmitting of the data packet may include controlling an input path chain for transmission of the data packet of a non-adjacent channel using a coordinator when the data packet is transmitted by carrier aggregation of the non-adjacent channel.

EFFECT

According to embodiments of the present invention, a power saving technology of a physical layer for wireless communication may be provided. In a battery-limited wireless communication apparatus, a battery lifetime may be increased by controlling a transmission method based on power consumption efficiency, a channel environment, and battery information.

Additionally, according to embodiments of the present invention, in the wireless communication apparatus supporting a multi-channel, power consumption may be reduced by controlling the transmission method based on power consumption efficiency of a hardware resource, a channel environment, and battery information.

Basically, power consumption in the wireless communication apparatus increases in proportion to the hardware resource and an operation frequency. The power consumption also increases according to an increase in a frequency band simultaneously by the wireless communication apparatus. Use in the hardware resource increases according to an increase in a non-adjacent band performing non-adjacent channel carrier aggregation.

Accordingly, the battery lifetime of the battery-limited wireless communication apparatus may be increased through control of the transmission method based on, the channel environment, and the battery information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
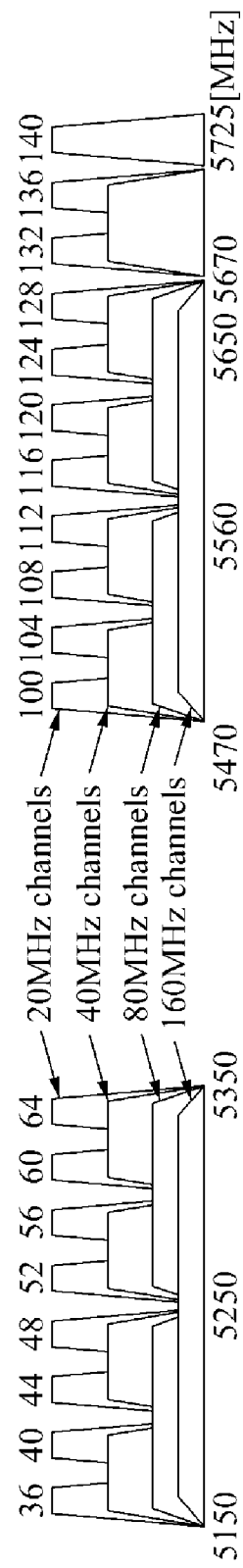
FIG. 1 is a diagram illustrating an arrangement of a 5 GHz band channel as an example of a channel allocation policy, according to an embodiment of the present invention.

Reference will now be made in detail to a multi-channel low power communication method and system according to exemplary embodiments of the present invention, examples of which are illustrated in the accompanying drawings, wherein like reference numerals refer to the like elements throughout.

A wireless local area network (WLAN) system operates by a contention and collision avoidance based transmission method of the carrier sense multiple access/collision avoidance (CSMA/CA) protocol. That is, the WLAN system determines whether another signal is present in a currently used channel for a predetermined time. When another signal is absent, the WLAN system determines that the channel is in an idle state and tries transmission. When carrier sensing is performed, the WLAN determines the channel is in a busy state, that is, in use, and defers transmission.

The WLAN system defines a power saving protocol informing of presence of a packet to be exchanged using a beacon signal. When a beacon signal is received, which informs that there is no packet to be exchanged, a terminal using a power saving mode is converted into a sleep mode and consumes minimum power, waiting for a next beacon. In a predetermined time, the terminal awakes from the sleep mode and receives the beacon to determine whether there is a packet to be exchanged. The power saving protocol is implemented in at least a medium access control (MAC) level. When the terminal is waked and activated due to the packet to be exchanged, the terminal needs to maintain a receiving mode.

FIG. 1 is a diagram illustrating an arrangement of a 5 GHz band channel as an example of a channel allocation policy, according to an embodiment of the present invention. The WLAN system has increased a data rate by expanding a channel bandwidth. The channel bandwidth is arranged so that bandwidth modes are not overlapped. According to the channel allocation policy of the 5 GHz scientific and medical (ISM) band as shown in FIG. 1, institute of electrical and electronics engineers (IEEE) 801.11a has a bandwidth of about 20 MHz, IEEE 802.11n has a bandwidth of about 20 MHz or 40 MHz, and IEEE 802.11ac has a bandwidth of about 20 MHz, 40 MHz, 80 MHz or 80+80 MHz. A next generation WLAN, such as HEW, is expected to support a bandwidth of about 160 MHz or higher.

Therefore, heterogeneous standard terminals may be present in same channels in adjacent locations or in adjacent channels. That is, an IEEE 801.11a terminal, an IEEE 801.11n terminal, an IEEE 802.11ac terminal, and a terminal of a standard following IEEE 801.11a may operate in a same service network area. Such a condition may also happen in a 2.4 GHz band or 1 GHz band or lower. In such a condition, terminals supporting a wide bandwidth to be provided with a high speed service are hard to be provided with the high speed service due to interference by same or adjacent channels.

Figure 2A:
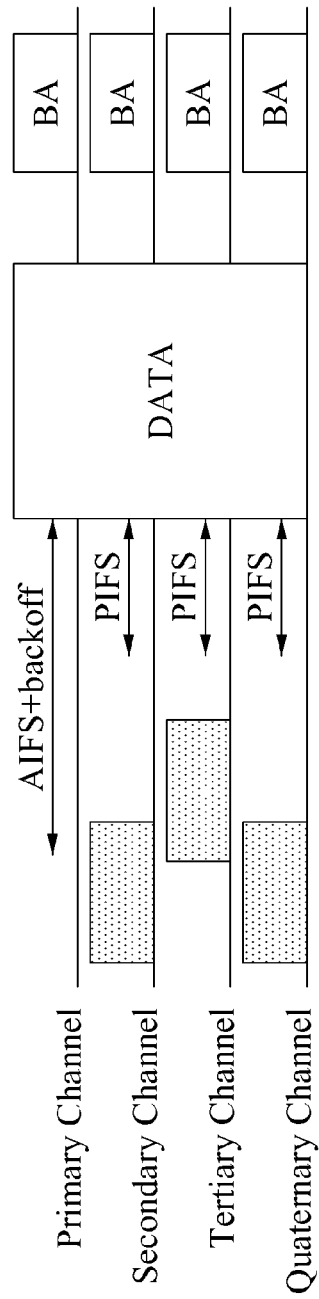
FIGS. 2A and 2B are diagrams illustrating a Point IFS (Inter Frame Space) (PIFS)-based multi-channel access method and a static bandwidth allocation method, according to an embodiment of the present invention.
Figure 2B:
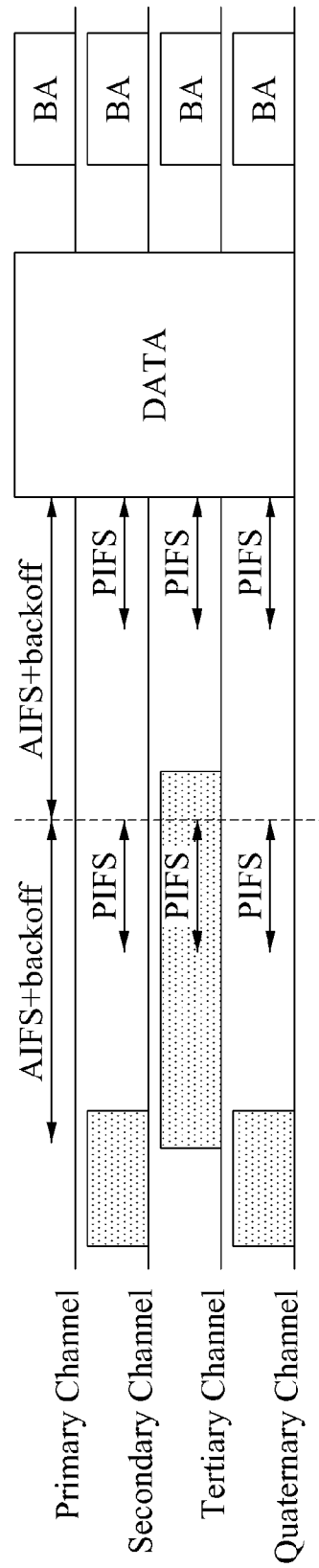

FIGS. 2A and 2B are diagrams illustrating a Point IFS (Inter Frame Space) (PIFS)-based multi-channel access method and a static bandwidth allocation method, according to an embodiment of the present invention.

A CSMA-based channel bonding protocol is used in the WLAN. A terminal intending to bond and transmit four channels as shown in FIG. 2A may periodically check channel clear assessment (CCA) of not only a primary channel but also other channels, and may transmit data using all of the four channels only when the channels are vacant for a predetermined time, that is, Arbitration IFS (AIFS)+Backoff and PIFS.

However, as aforementioned, it is extremely difficult to meet the condition in a complex wireless channel environment. That is, when even one channel out of a plurality of channels to be bonded does not meet the condition as shown in FIG. 2B in which grey denotes an interference signal, the channel may not obtain a transmission opportunity but has to wait for another transmission opportunity. Only when all the four channels are vacant for the predetermined time, data transmission may be performed using the all four channels.

Figure 3:
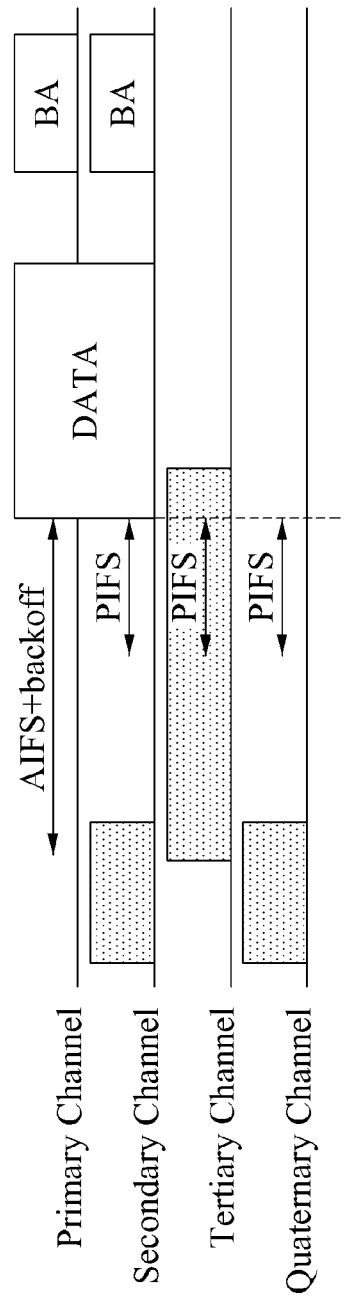
FIG. 3 is a diagram illustrating a dynamic bandwidth allocation method according to an embodiment of the present invention.

To solve the foregoing limit, a dynamic bandwidth allocation method as shown in FIG. 3 may be applied. According to the embodiment, in an environment including totally four channels, channel bonding may be performed with respect to only two channels meeting the condition, instead of all the four channels, to transmit data. That is, when a sub channel to be bonded for data transmission includes another signal, data transmission may be performed using remaining channels excluding the sub channel.

Figure 4:
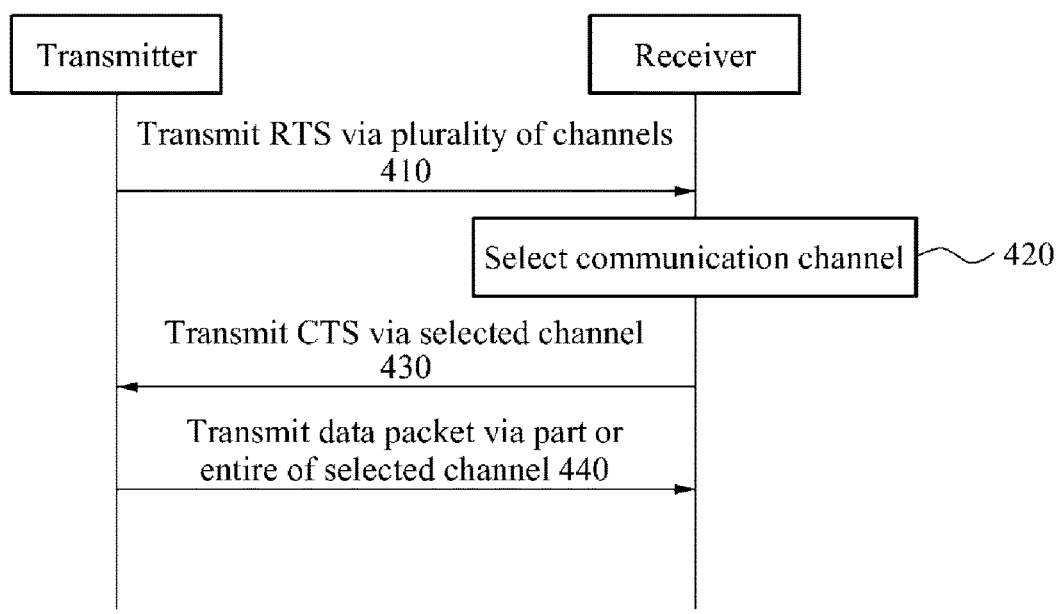
FIG. 4 is a flowchart illustrating a multi-channel low power communication method according to an embodiment of the present invention.

FIG. 4 is a flowchart illustrating a multi-channel low power communication method according to an embodiment of the present invention. The method according to the embodiment of the present invention uses a request frame such as request to send (RTS) and a response frame such as clear to send (CTS) in addition to the embodiment of FIG. 3 and may be performed between a transmitter and a receiver for data.

In operation 410, the transmitter may transmit the RTS to the receiver through a plurality of communication channels. The receiver may receive the RTS transmitted from the transmitter. In operation 420, the receiver may select at least one communication channel from the plurality of communication channels having received the RTS.

In operation 430, the receiver may transmit the CTS to the transmitter as a response to the RTS with respect to the selected communication channel. The transmitter may receive the CTS transmitted from the receiver. In operation 440, the transmitter may transmit a data packet to the transmitter through the selected communication channel, and part or entire of at least one communication channel having received the CTS. The receiver may receive the data packet from the transmitter.

Figure 5:
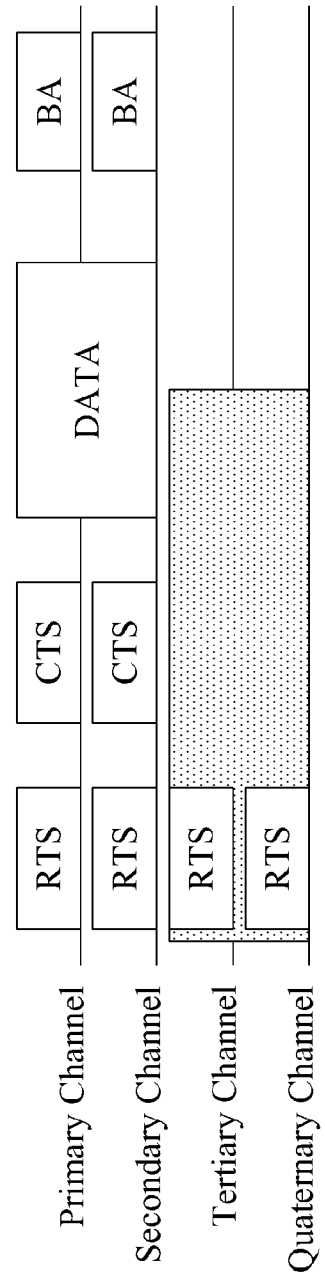
FIG. 5 is a diagram illustrating a multi-channel low power communication method according to an embodiment of the present invention.

The method described with reference to FIG. 3 may also be effective in a case in which the RTS and the CTS are used. A dynamic bandwidth allocation protocol of FIG. 4 transmits the data packet, including static and dynamic bandwidth allocation mode information and bandwidth mode information in the data packet, thereby achieving efficient operation. The dynamic bandwidth allocation method using the RTS and the CTS is illustrated in FIG. 5. The RTS and the CTS include a multi-channel power save information field related to multi-channel power saving. The multi-channel power save information field will be described in detail later.

In operation 420, at least one communication channel may be selected from the plurality of communication channels having received the RTS, based on a channel state and an interference state of each of the plurality of communication channels.

When all channels are affected by the interference signal and therefore a transmission rate is low, absence of a transmission channel is notified through the response frame and a power save mode begins.

In operation 440, the transmitter may bond at least one communication channel having received the CTS and transmit the data packet through the bonded communication channel. Here, the data packet may not be transmitted to a communication channel having not received the CTS among the plurality of communication channels.

Operation 440 may include determining at least one communication channel when the receiver receives the data packet from the transmitter among the at least one selected communication channel. In the embodiment, the communication channel may be determined by checking CTS including information on at least one communication channel to receive the data packet from the transmitter among the at least one selected communication channel.

The determining of the communication channel may be performed based on the channel state of each of the at least one selected communication channel and a battery capacity or budget information of a transceiver. Here, a channel of which use efficiency with respect to a battery use quantity is higher than a predetermined value may be determined to be the communication channel to receive the data packet from the transmitter, among the at least one selected communication channel. Alternatively, the channel may be determined with respect to adjacent channels among the at least one selected communication channel.

The transmission method for efficiently using the channel bandwidth needs to also consider power efficiency. A battery state of the transceiver, an execution object, and an environmental condition are to be considered for the operation. A wireless communication apparatus consumes more power as a used bandwidth is larger. This is because a larger bandwidth requires a higher processing speed, that is, an operation frequency, of a wireless communication circuit.

Figure 6A:
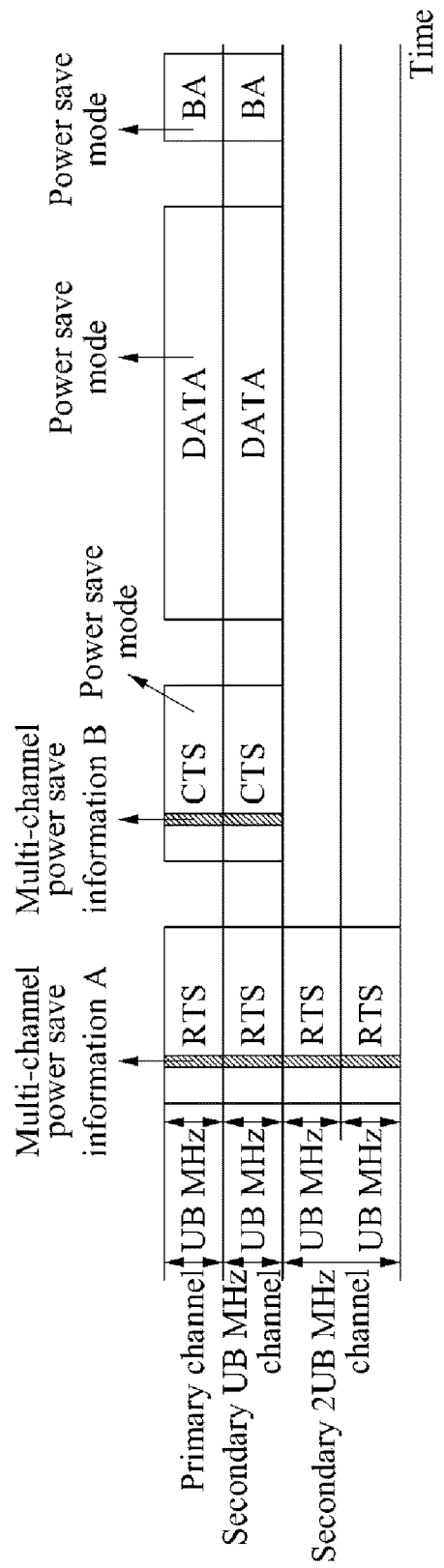
FIGS. 6A to 6C are diagrams illustrating examples of a multi-channel low power communication method according to an embodiment of the present invention.
Figure 6B:
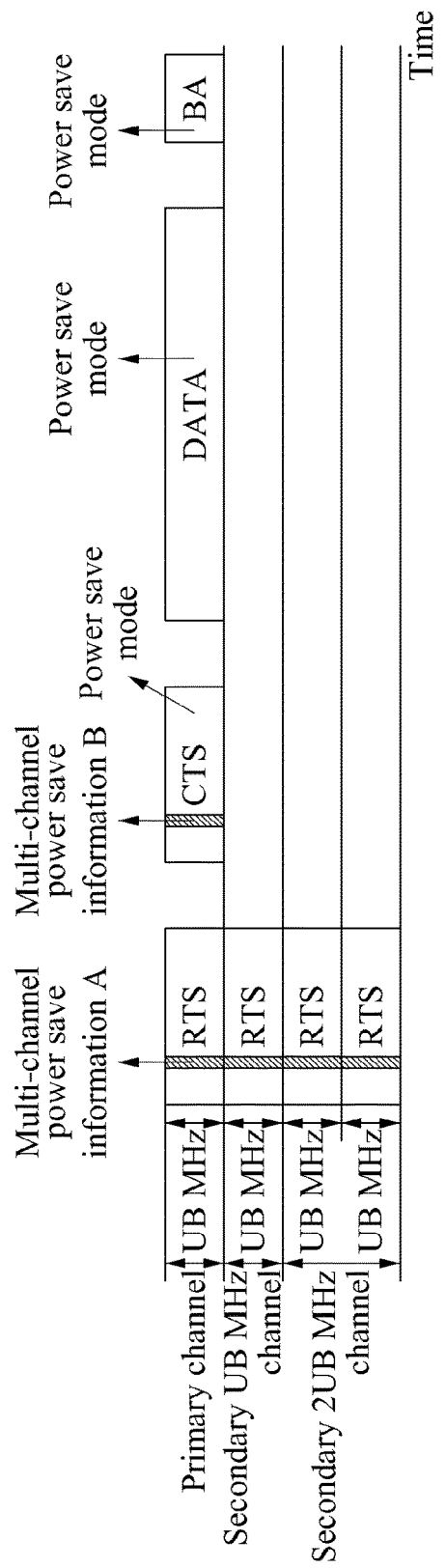
Figure 6C:
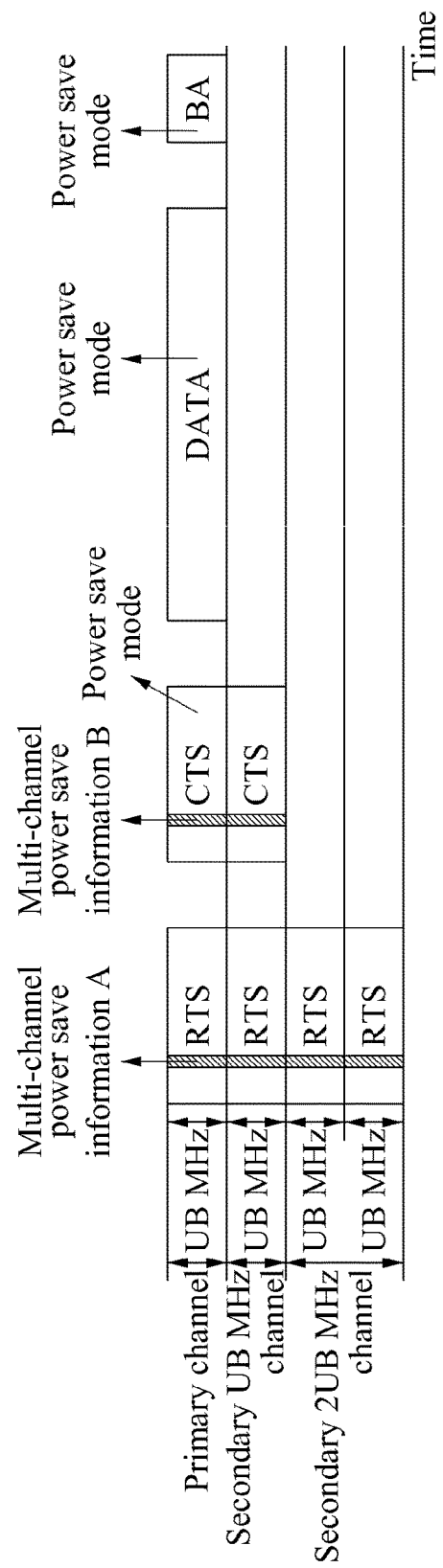

FIGS. 6A to 6C are diagrams illustrating examples of a multi-channel low power communication method according to an embodiment of the present invention. In FIGS. 6A to 6C, UB denotes a unit band supported by a wireless communication apparatus. For example, in case of the WLAN in which a minimum unit channel is defined in units of 20 MHz, the UB is 20.

All channels other than a primary channel are defined as secondary channels. A unit channel next to the primary channel is expressed by a secondary UB. A secondary 2UB denotes a tertiary channel and a quaternary channel. Multi-channel power save information A and B may refer to information fields to be transmitted using a multi-channel power save technology.

FIG. 6A shows an example of multi-channel power save technology that aggregates four bands and transmits RTS to four bands, but performs communication with only two bands. The transmitter may request the multi-channel power save through the multi-channel power save information field of the RTS. Alternatively, the receiver may request the multi-channel power save through the multi-channel power save information field of CTS.

Thus, by transmitting the RTS, the transmitter may inform other nodes or receivers included in the network of reduction in channels to save power. The receiver may request the transmitter to reduce a transmission bandwidth to save power.

In FIG. 6B, fewer channels are used than in FIG. 6A. Therefore, when the operation frequency is reduced to about a half in FIG. 6A, the operation frequency of FIG. 6B may be reduced to about a quarter. Thus, according the embodiment of the present invention, power saving efficiency may be improved.

In FIG. 6C, it is requested that a channel of a smaller width be used for transmission of a data packet during transmission of CTS. During exchange of RTS and CTS, a channel state and a network interference state may be measured. The power saving efficiency may be increased by using the RTS and the CTS in consideration of a battery capacity and the channel state of the wireless communication apparatus.

In the embodiment, a multi-channel low power communication method may be performed through the data packet and an acknowledge (ACK) frame, without using the RTS and the CTS.

Figure 7A:
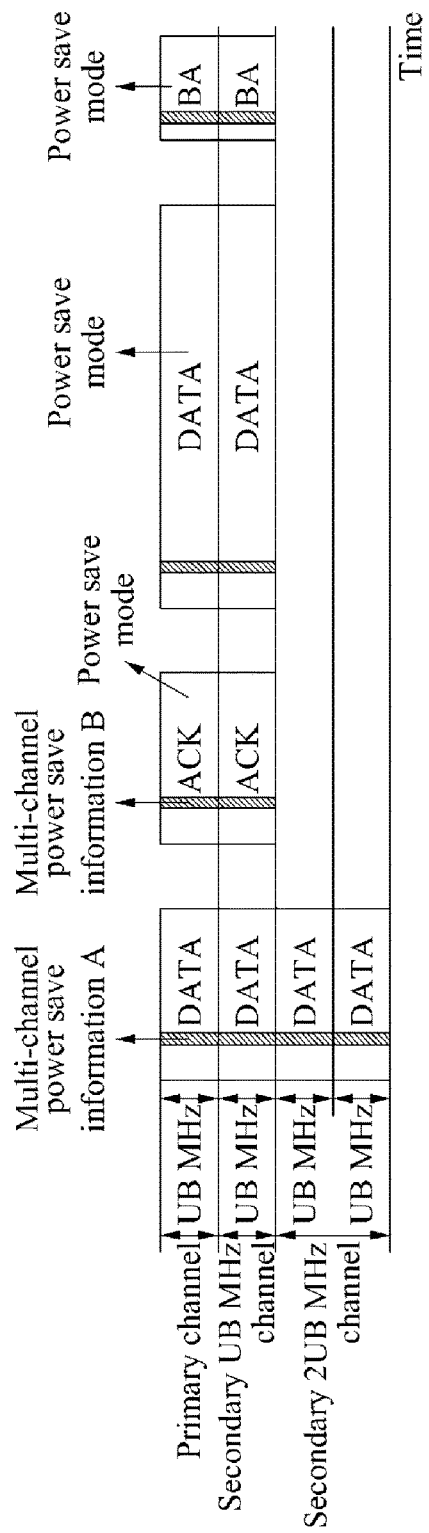
FIGS. 7A and 7B are diagrams illustrating transmission of a long aggregation packet using data and an acknowledge (ACK) signal, according to an embodiment of the present invention.
Figure 7B:
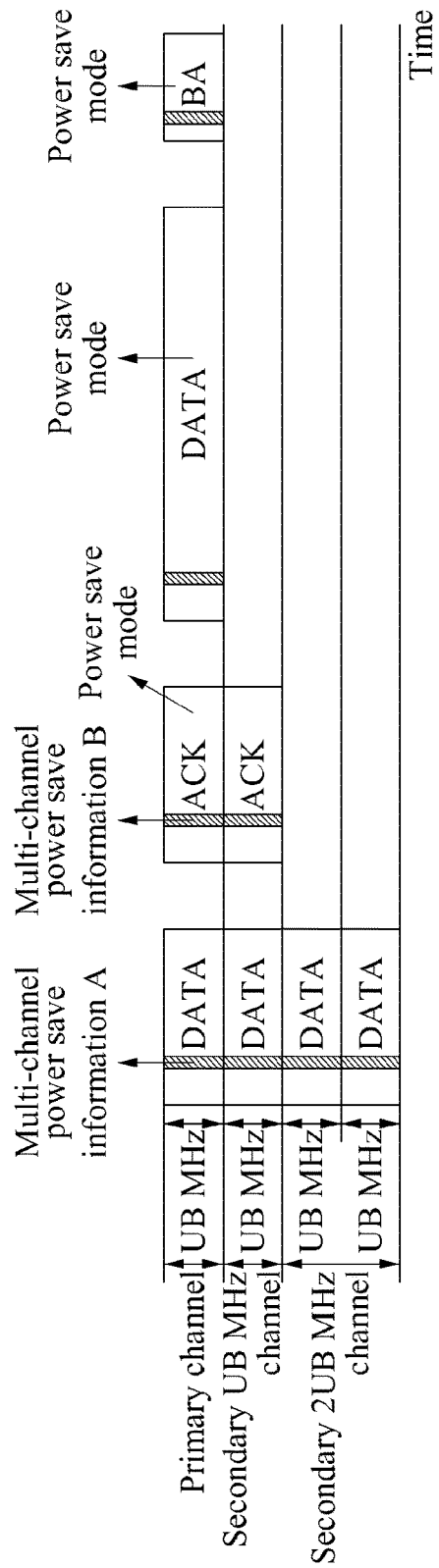

FIGS. 7A and 7B are diagrams illustrating transmission of a long aggregation packet using data and an ACK signal, according to an embodiment of the present invention.

In FIG. 7A, the operation frequency may be reduced by reducing a bandwidth to about a half with respect to an available bandwidth. In FIG. 7B, a multi-channel power save environment is set by transmitting a short data packet before transmission of the long aggregation data packet, and then the long aggregation data packet is transmitted through a selected channel.

Here, the short data packet refers to a packet transmitted to all channels in FIGS. 7A and 7B, before the long aggregation data packet is transmitted. The short data packet is named so since it is relatively shorter than the long aggregation data packet. The transmitter may receive information on a channel proper for power saving among a plurality of channels from the receiver, by transmitting the short data packet. The long aggregation data packet refers to a data packet actually transmitted to the receiver, which is relatively longer than the short data packet.

In the multi-channel low power communication method using the data packet and the ACK frame, the transmitter may bond at least one communication channel having received the short data packet among the plurality of communication channels, and transmit the long aggregation data packet to the receiver through the bonded communication channel. Here, the long aggregation data packet may not be transmitted to a communication channel having not received the ACK frame among the plurality of communication channels.

Here, at least one of the short data packet and the ACK frame may include an information field related to the multi-channel power save.

Figure 8:
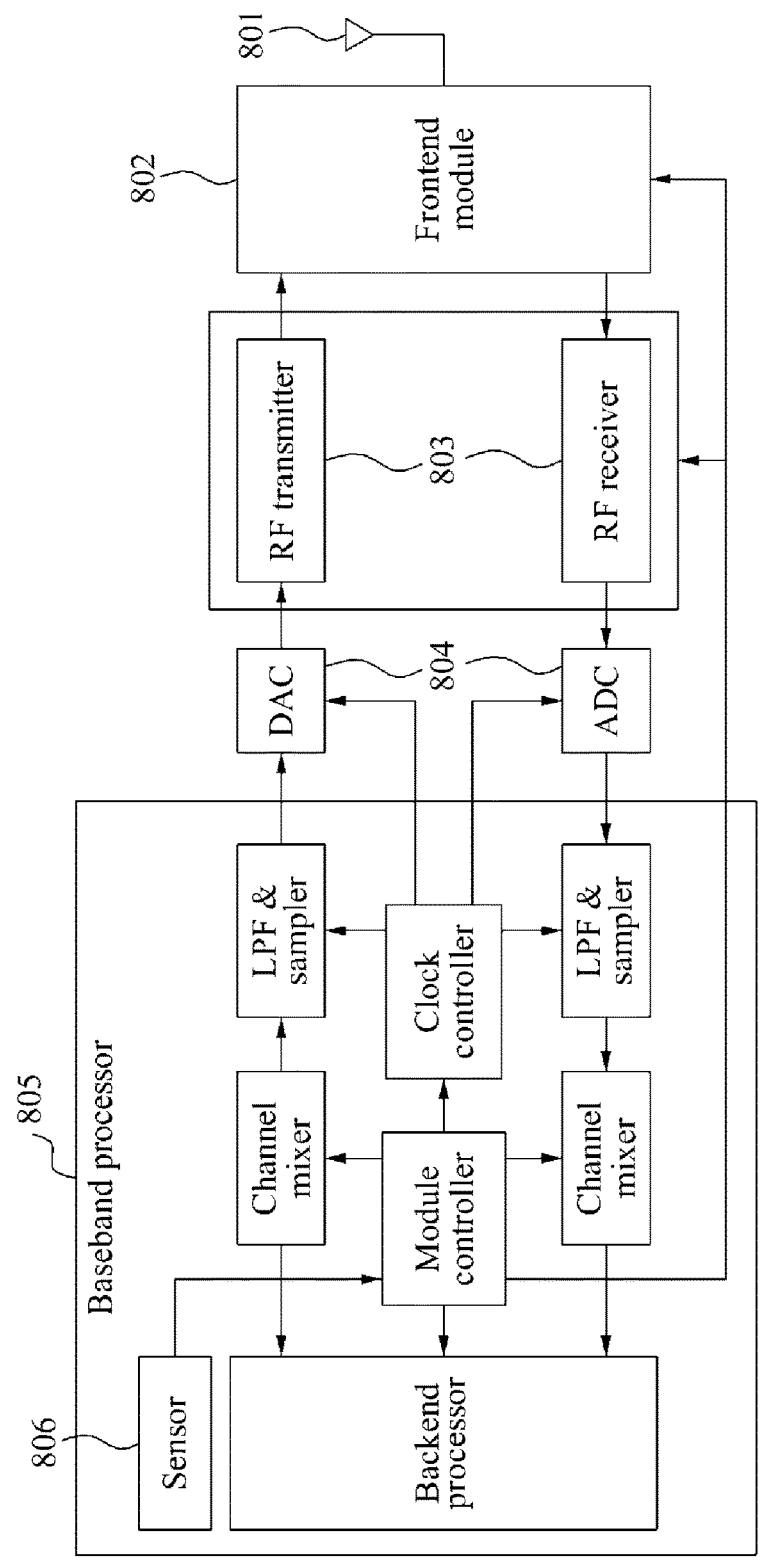
FIG. 8 is a block diagram illustrating a configuration of an adjacent channel bonding transceiving apparatus according to an embodiment of the present invention.

FIG. 8 is a block diagram illustrating a configuration of an adjacent channel bonding transceiving apparatus according to an embodiment of the present invention. The transceiving apparatus according to the embodiment may include a transceiving antenna 801, a frontend module 802, a transceiving unit 803, an analog-to-digital converter and digital-to-analog converter (ADC/DAC) 804, a baseband processor 805, and a sensor 806.

A wireless signal may be transmitted and received through the transceiving antenna 801. The frontend module 802 may function as an interface between the transceiving antenna 801 and the transceiving unit 803. The frontend module 802 may include various external devices not included in the transceiving unit 803 or devices for performance improvement and function expansion. For example, an external transmission power amplifier or an external receiving low noise amplifier, a switch, and the like may be included. The transceiving unit 803 may modulate and transmit the packet to be transmitted, and demodulate the received packet. The ADC and DAC 804 may convert a signal type between an analog signal and a digital signal.

The baseband processor 805 may generate a frame corresponding to a transmission frame format, extract information from a received frame, or compensate a distorted signal caused by encoding, decoding, channel, or an analog device. A backend processor of the baseband processor 805 may perform sampling and filtering at a frontend of a digital circuit and transmits a channel mixing result to an analog circuit. A circuit for sampling, filtering, and channel mixing is configured to maintain a same signal format, such as a bandwidth, although the operation frequency of a wireless communication transceiver is changed using a clock controller and a mode controller. For example, when the operation frequency of the wireless communication system is reduced to about a half, a bandwidth of a spectrum of a frequency domain may be reduced to about a half unless other processing is performed. Here, when sampling is doubled and filtering and channel mixing are performed corresponding to the sampling, the signal format of before change of the operation frequency may be maintained.

The sensor 806 may be a sensor module adapted to detect battery information and a state of the wireless apparatus. The sensor 806 may inform the mode controller of a detection result.

Figure 9A:
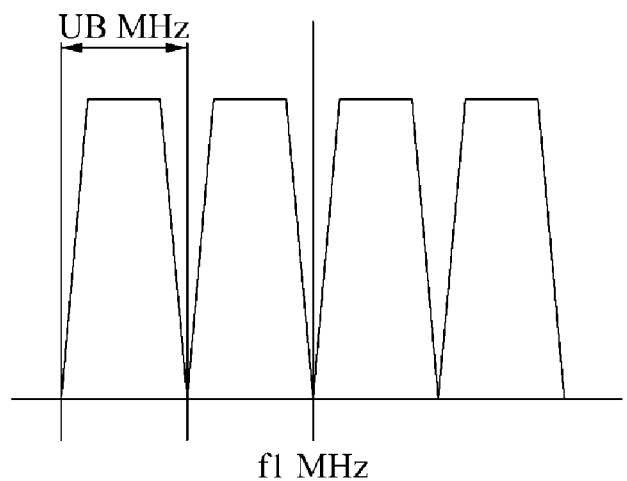
FIGS. 9A and 9B are diagrams illustrating an adjacent channel bonding transmission spectrum and a transmission spectrum using a multi-channel power save mode according to an embodiment of the present invention.
Figure 9B:
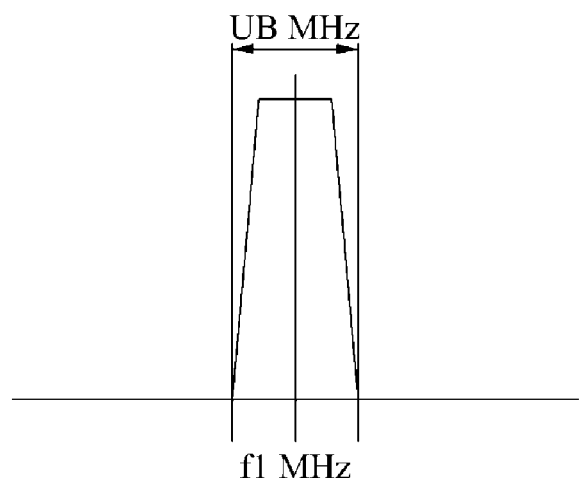

FIGS. 9A and 9B are diagrams illustrating an adjacent channel bonding transmission spectrum and a transmission spectrum using a multi-channel power save mode, according to an embodiment of the present invention. In FIGS. 9A and 9B, f1 denotes an operation frequency requested when transmission is performed by bonding four bands as shown in FIG. 9A. When a transmitter and a receiver agree to use only one band as shown in FIG. 9B by the multi-channel power save mode, wireless communication is enabled with the operation frequency of only about f1/4.

Figure 10:
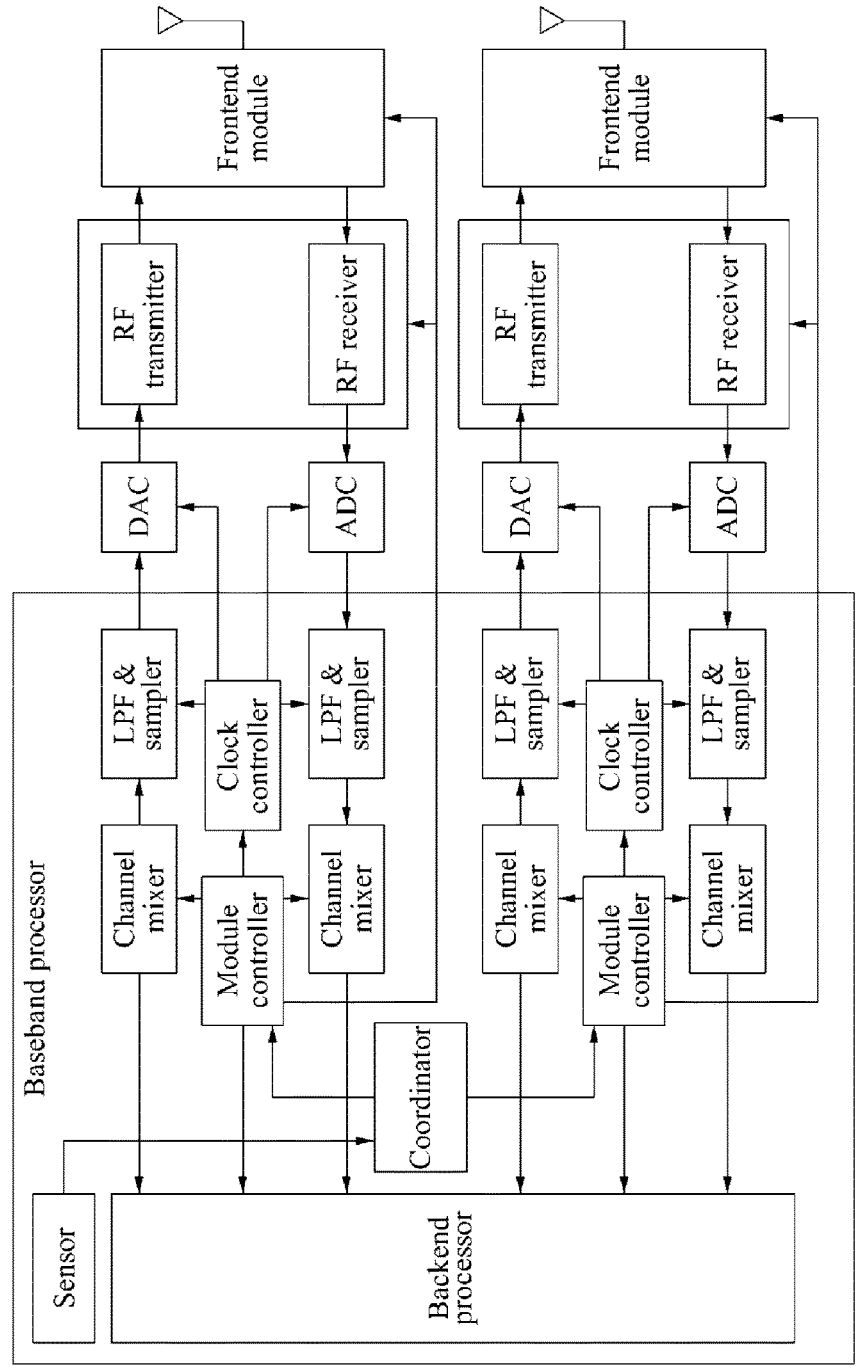
FIG. 10 is a diagram illustrating a non-adjacent channel carrier aggregation transceiving apparatus according to an embodiment of the present invention.

FIG. 10 is a block diagram for describing a configuration of a non-adjacent channel carrier aggregation transceiving apparatus according to an embodiment of the present invention. The non-adjacent channel carrier aggregation transceiving apparatus may be connected with the adjacent channel bonding transceiving apparatus of FIG. 8 through a coordinator.

When transmission is performed by aggregating the non-adjacent channel, additional operation of a hardware resource is necessary. Accordingly, energy consumption is greatly increased. This is because a radio frequency (RF), an ADC, and a DAC for channel transceiving may be additionally necessary due to an extremely large gap between non-adjacent channels. However, as long as a battery power resource is a main factor that determines the transmission method, the transmission method using the non-adjacent channel carrier aggregation is very inefficient in terms of power efficiency.

The coordinator of FIG. 10 may control an input path chain for transceiving of each of the non-adjacent channels. Through the control, the mode controller of each path may control the clock controller and peripheral devices.

FIGS. 11A to 11D are diagrams illustrating a non-adjacent channel carrier aggregation spectrum and a non-adjacent channel carrier aggregation spectrum of a multi-channel power save mode, according to an embodiment of the present invention.

Figure 11A:
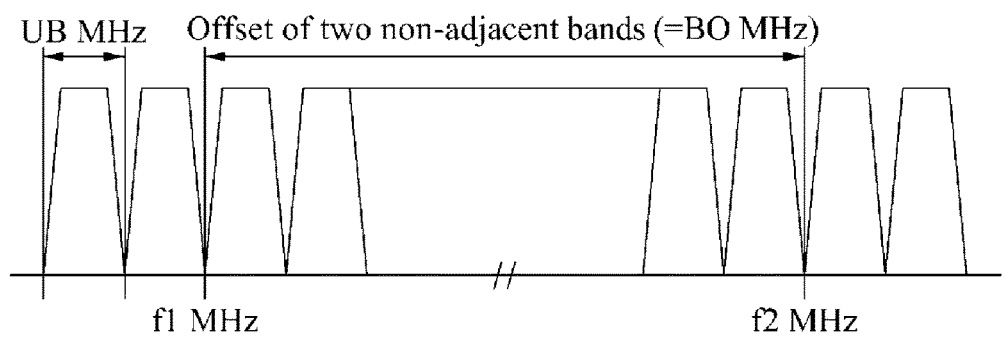
FIGS. 11A to 11D are diagrams illustrating a non-adjacent channel carrier aggregation spectrum and a non-adjacent channel carrier aggregation spectrum of a multi-channel power save mode, according to an embodiment of the present invention.
Figure 11B:
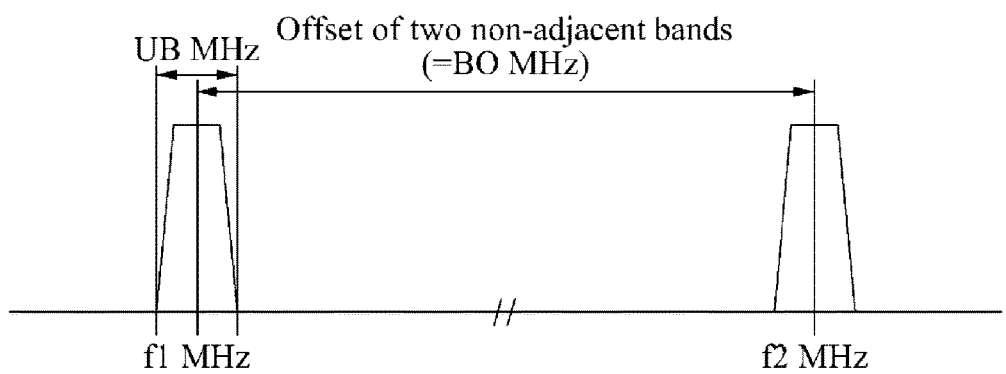
Figure 11C:
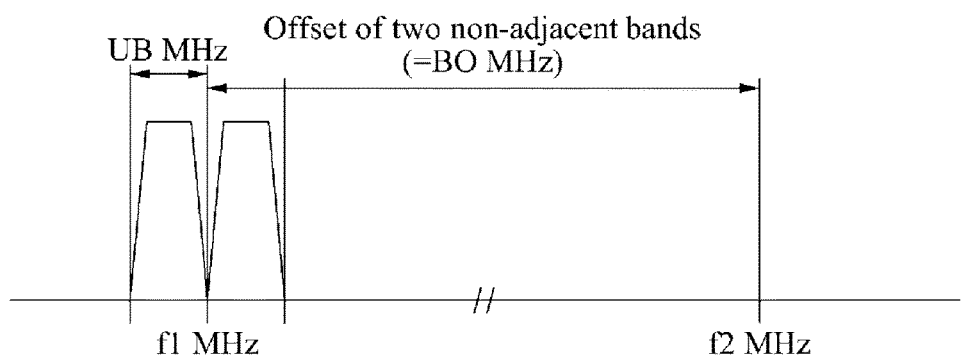
Figure 11D:
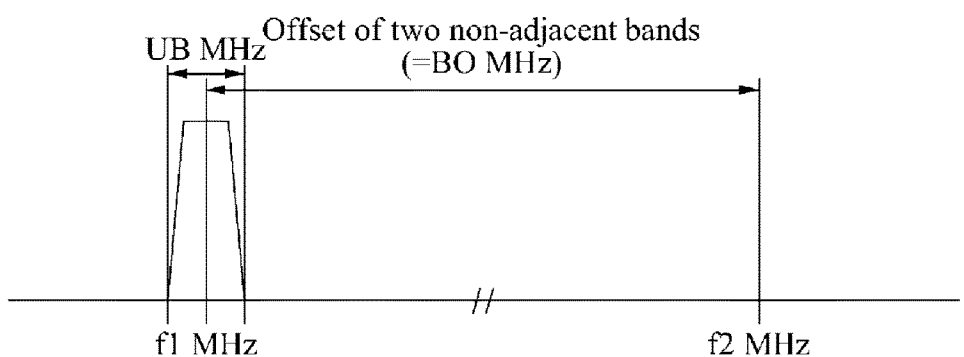

FIG. 11A shows a spectrum of when carrier aggregation is performed with respect to non-adjacent channels bonding four adjacent channels. To reduce a battery use quantity, a wireless terminal may select a best band from available bands and perform transmission using a multi-channel power save technology using a narrow band. FIG. 11B shows a spectrum of when carrier aggregation is performed using only one band of each of the non-adjacent channels. FIG. 11C shows a spectrum of when adjacent-channel bonding transmission is performed by aggregating to one band rather than using double hardware resources, to support non-adjacent channel carrier aggregation transceiving. FIG. 11D shows a spectrum of when a lowest operation frequency is used to further reduce power consumption in comparison to FIG. 11C.

FIGS. 12 to 16 are diagrams illustrating a multi-channel low power communication method of non-adjacent channel carrier aggregation according to an embodiment of the present invention.

Figure 12:
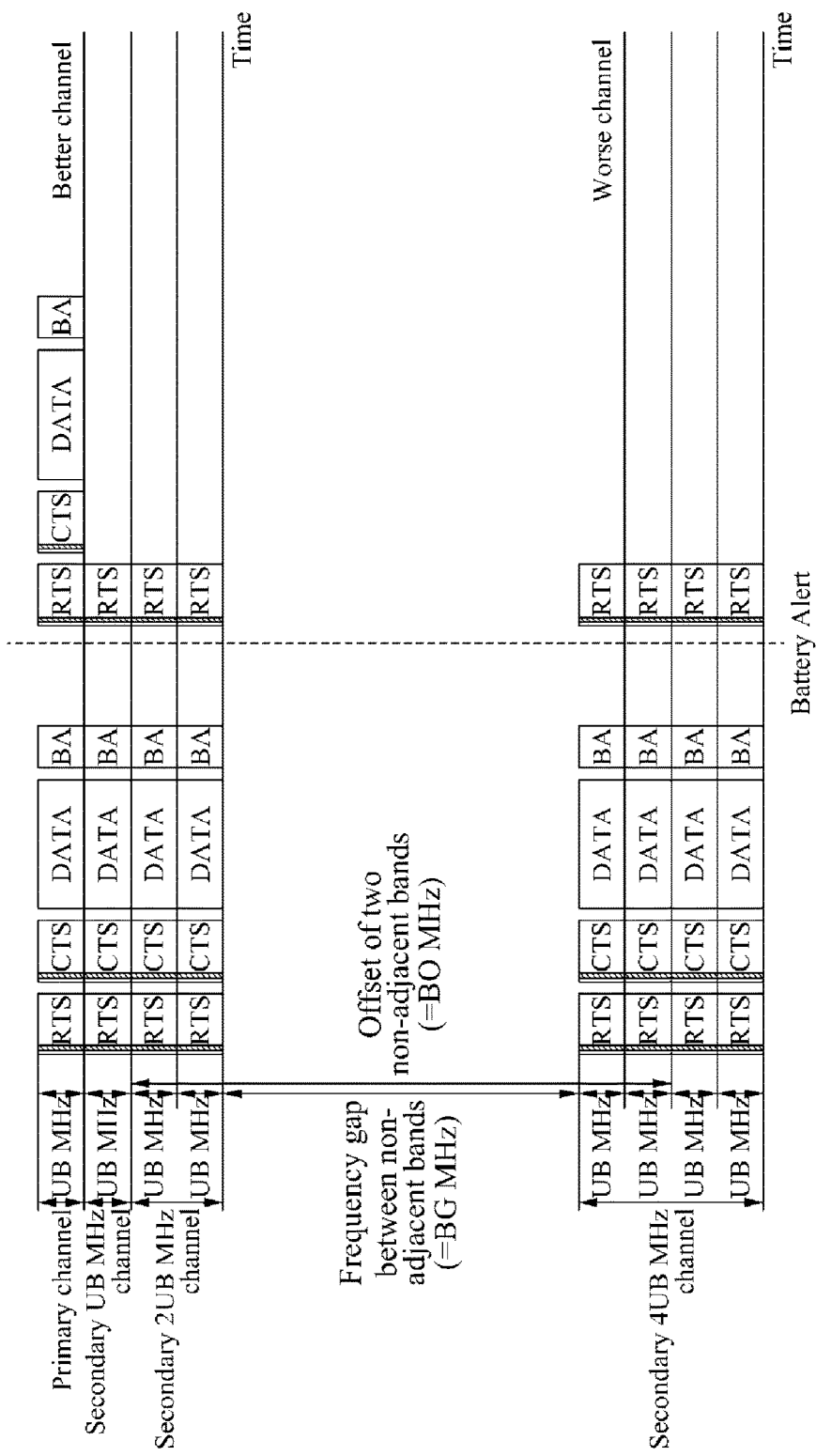
FIGS. 12 to 16 are diagrams illustrating a multi-channel low power communication method according to an embodiment of the present invention.

FIG. 12 shows an example of multi-channel power save of non-adjacent channel carrier aggregation. In FIG. 12, BG denotes a band gap, that is, a frequency interval between non-adjacent channels, and BO denotes band offset, that is, a center frequency interval between the non-adjacent channels. Basically, the wireless communication system periodically checks the battery use quantity and compares remaining battery capacity, that is, energy budget, with respect to a function and target, such as the lifetime, to be performed by the wireless communication system. When the remaining battery capacity is determined to be insufficient, the wireless communication system may reduce a transmission bandwidth using the multi-channel power save transmission method, or perform transmission by the adjacent channel aggregation transmission method instead of the non-adjacent channel aggregation transmission method.

Figure 13:
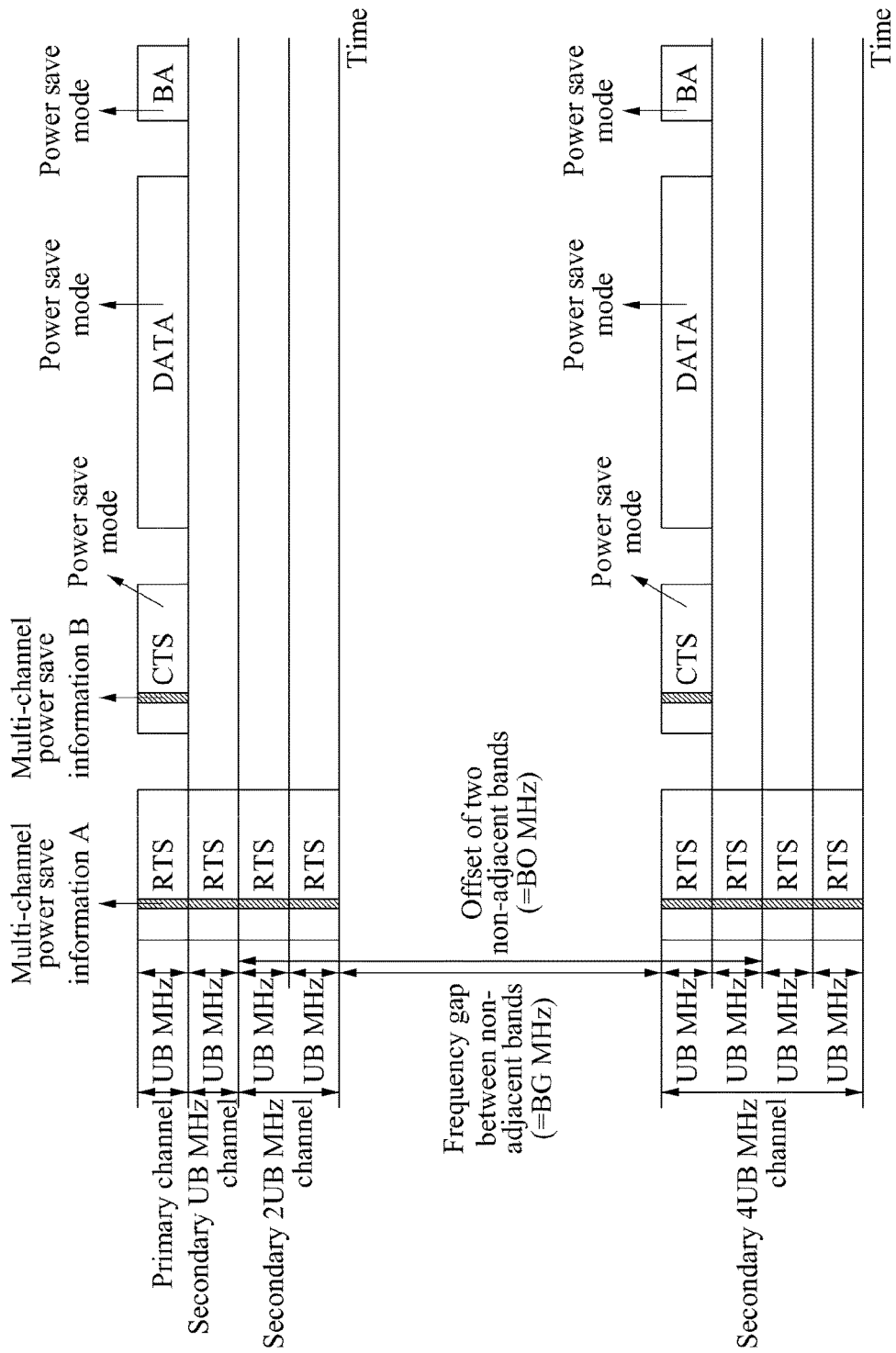
Figure 14:
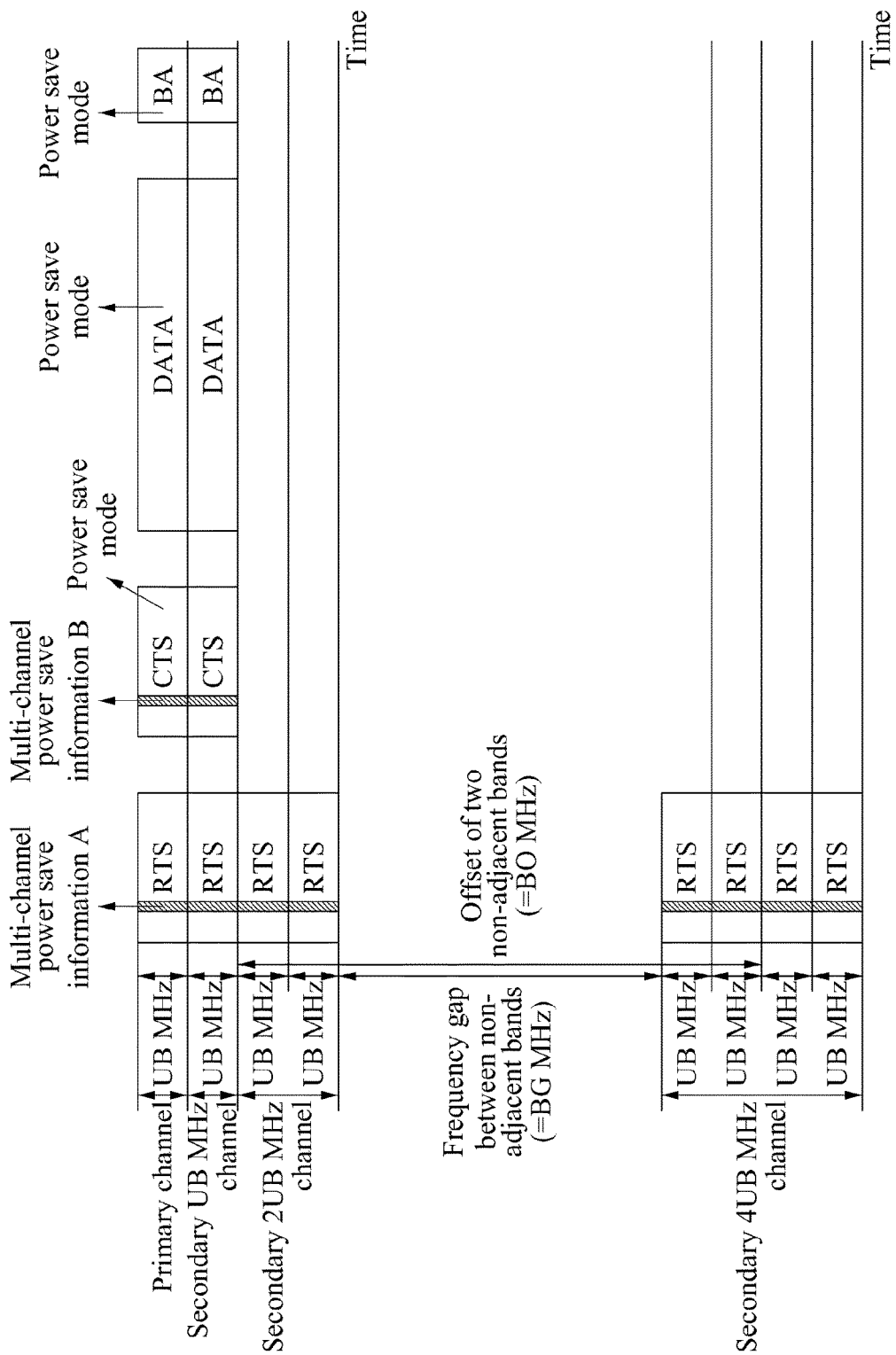

FIG. 13 illustrates an example of carrier aggregation transmission using only one band of each of the non-adjacent channels. FIG. 14 illustrates an example of adjacent-channel bonding transmission performed by aggregating to one band rather than using double hardware resources, to support non-adjacent channel carrier aggregation transceiving.

Figure 15:
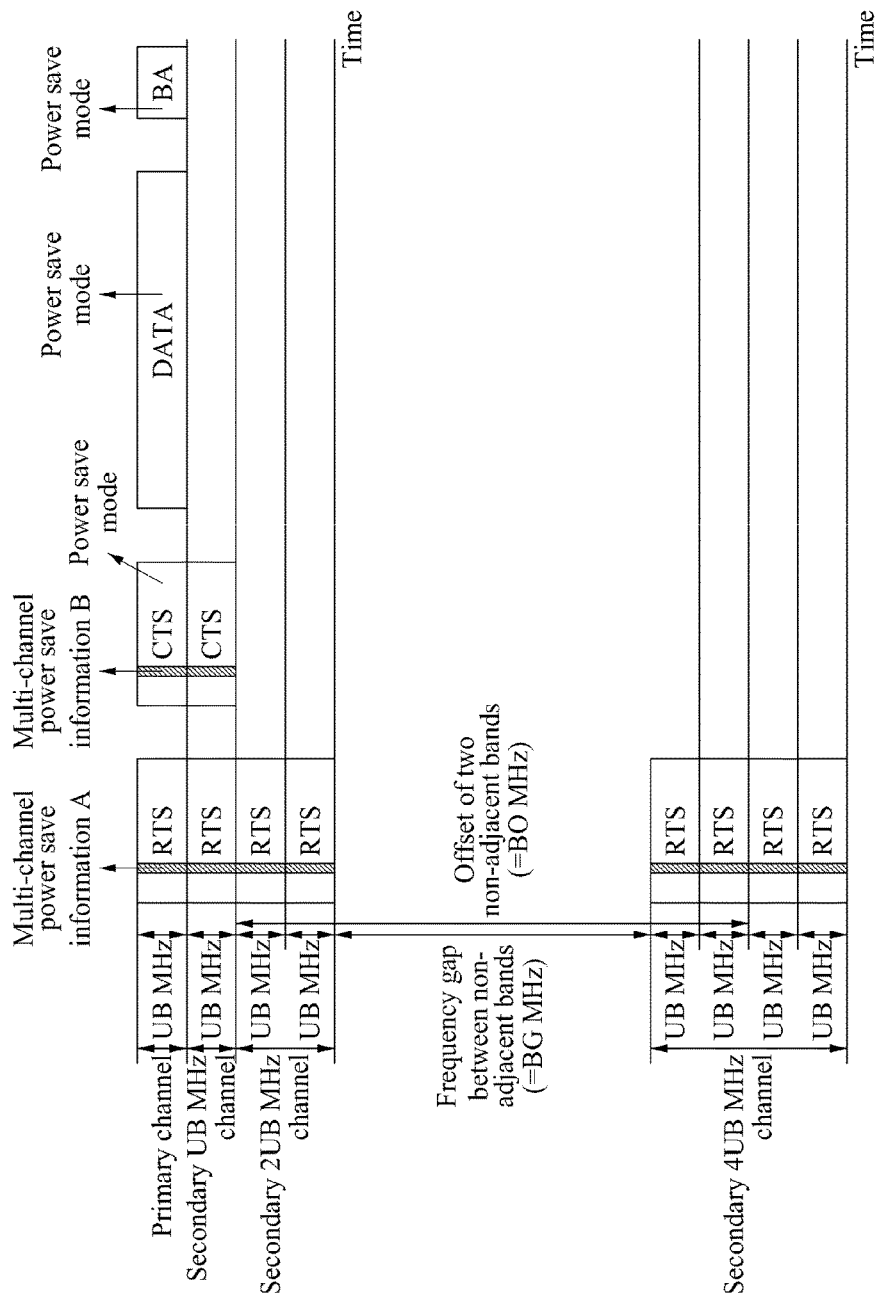

FIG. 15 illustrates an example of using a lowest operation frequency to further reduce power consumption in comparison to FIG. 14.

Figure 16:
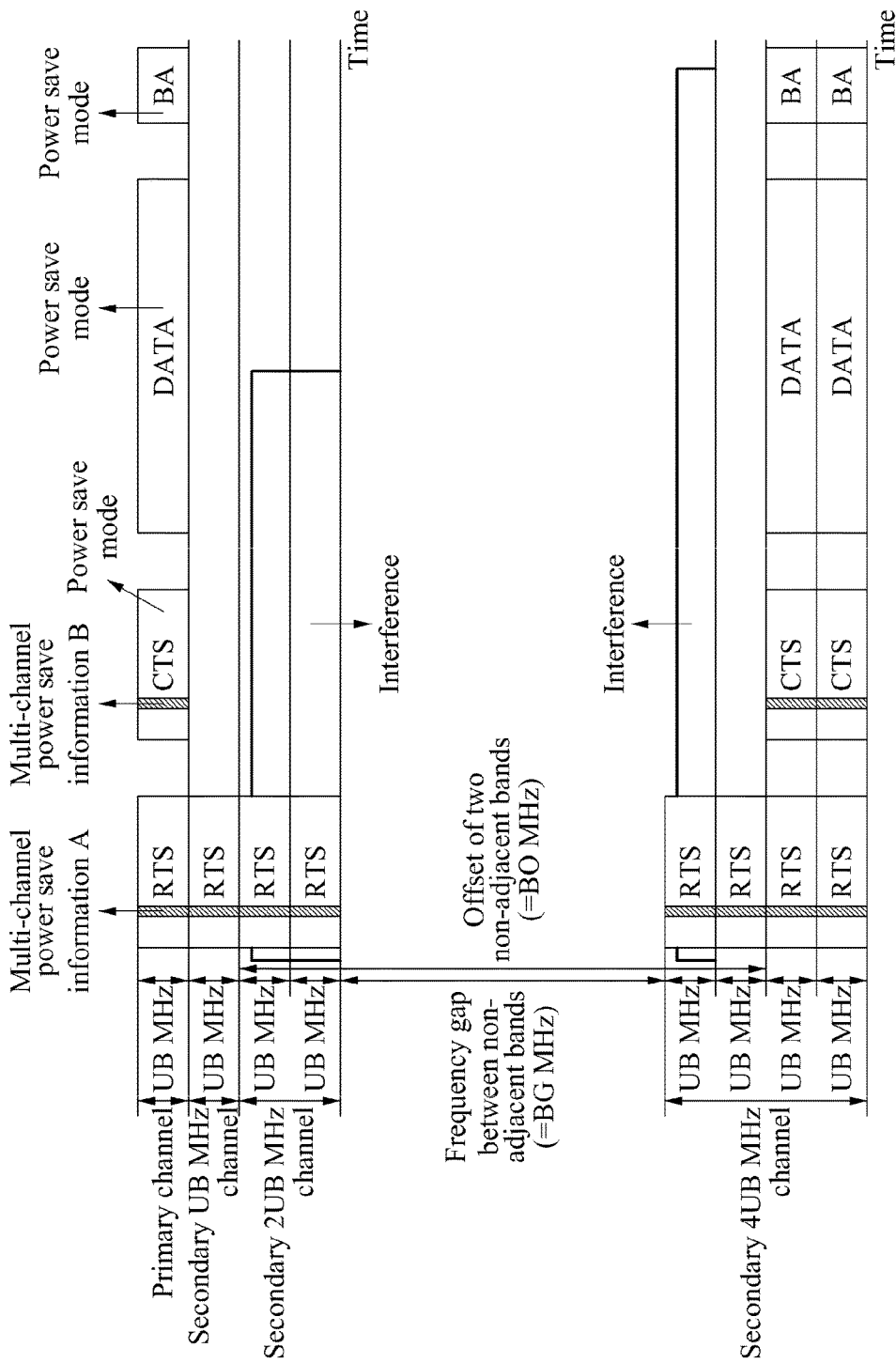

FIG. 16 illustrates an example case in which an interference signal is present. A bandwidth and a band used by the multi-channel low power communication method according to the embodiment of the present invention may be used. When it is determined that use efficiency of a corresponding channel is deteriorated with respect to the battery use quantity according to not only the interference signal but also the channel state, only an efficient channel may be selected for transmission, thereby increasing the battery use efficiency.

Figure 17:
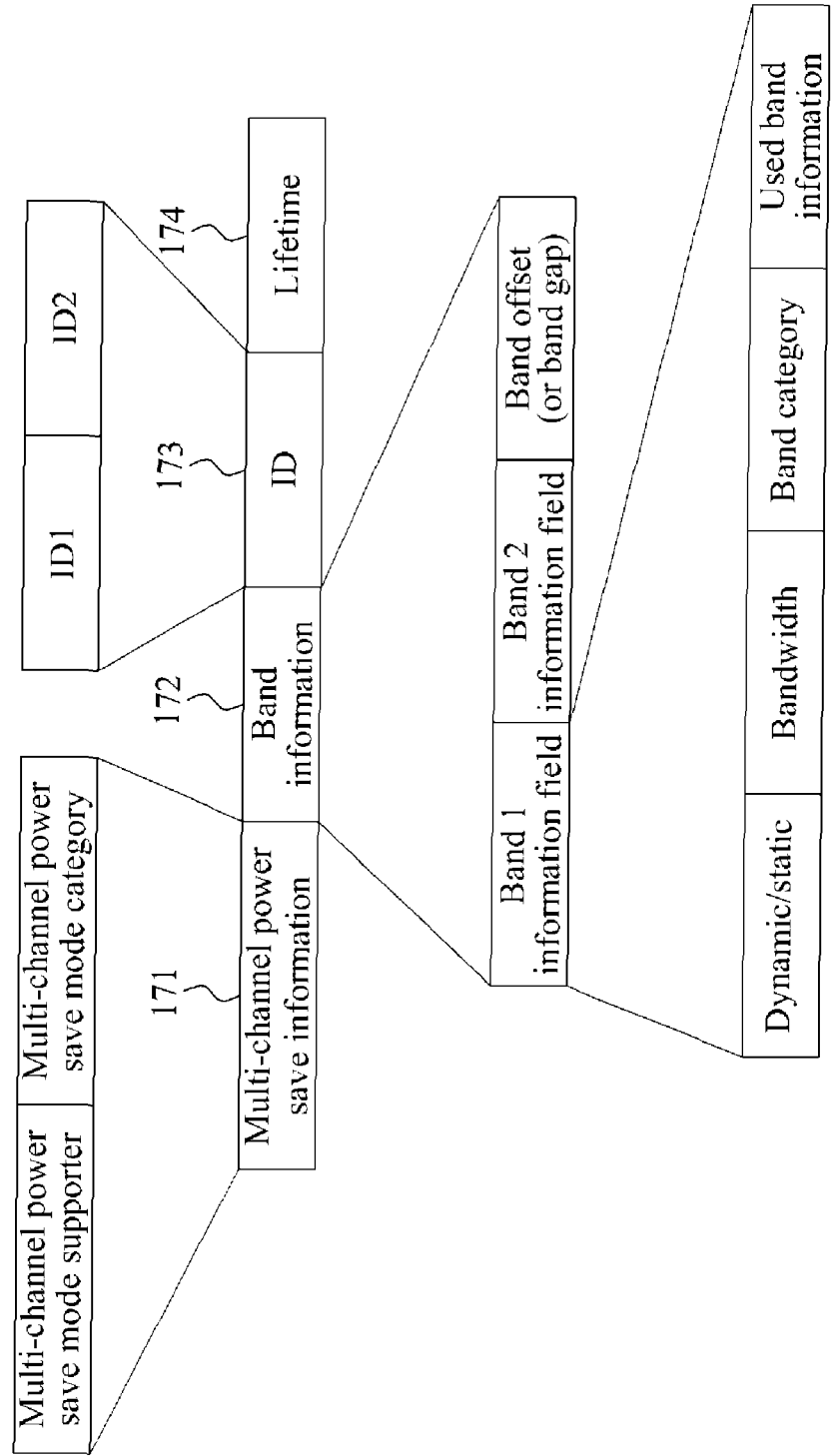
FIG. 17 is a diagram illustrating a configuration of a multi-channel power save information field, according to an embodiment of the present invention.

FIG. 17 is a diagram illustrating a configuration of a multi-channel power save information field, according to an embodiment of the present invention. The multi-channel power save information field may include four information, that is, multi-channel power save information 171, band information 172, an identifier (ID) information 173, and lifetime information 174.

The multi-channel power save information 171 may include whether the multi-channel power save mode is supported, that is, multi-channel power save mode support, and multi-channel power save mode category. The multi-channel power save mode category refers to a power save transmission method recommended according to the multi-channel power save mode policy.

1) Multi-channel power save policy information in view of hardware power consumption efficiency: For example, this information informs which is more recommended between the adjacent channel bonding transmission method and the non-adjacent channel carrier aggregation transmission method. Since power consumption of the hardware resource is different according to terminals, power consumption efficiency may also be different between the adjacent channel bonding transmission method and the non-adjacent channel carrier aggregation transmission method. This information may indicate which of the two methods is more recommended.

2) Multi-channel power save policy information in view of network operation efficiency: This information refers to information on band selective transmission method support according to the channel state.

3) Multi-channel power save policy information in view of battery information: This information may indicate whether battery consumption needs to be absolutely minimized by battery warning, or may directly recommend a transmission method, thereby supporting multi-channel power save transmission.

The band information 172 may include band information of an adjacent channel or non-adjacent channel. Band information 1 and band information 2 may each include allocation of a dynamic or static bandwidth of the adjacent band, the bandwidth, the bandwidth category, and information on a used band. The band offset refers to a center frequency interval between two non-adjacent bands.

At least one piece of the ID information 173 may be included in the multi-channel power save information field. The ID information 173 enables discrimination of wireless communication apparatuses having different destination according to the non-adjacent channels. For example, ID 1 may be defined for communication with a terminal 1 that uses a frequency channel f1 while ID 2 may be defined for transmission with a terminal 2 that uses a frequency channel f2.

The lifetime information 174 may include a remaining lifetime of the wireless communication terminal transmitting packets, and remaining battery capacity information with respect to a required function.

Figure 18:
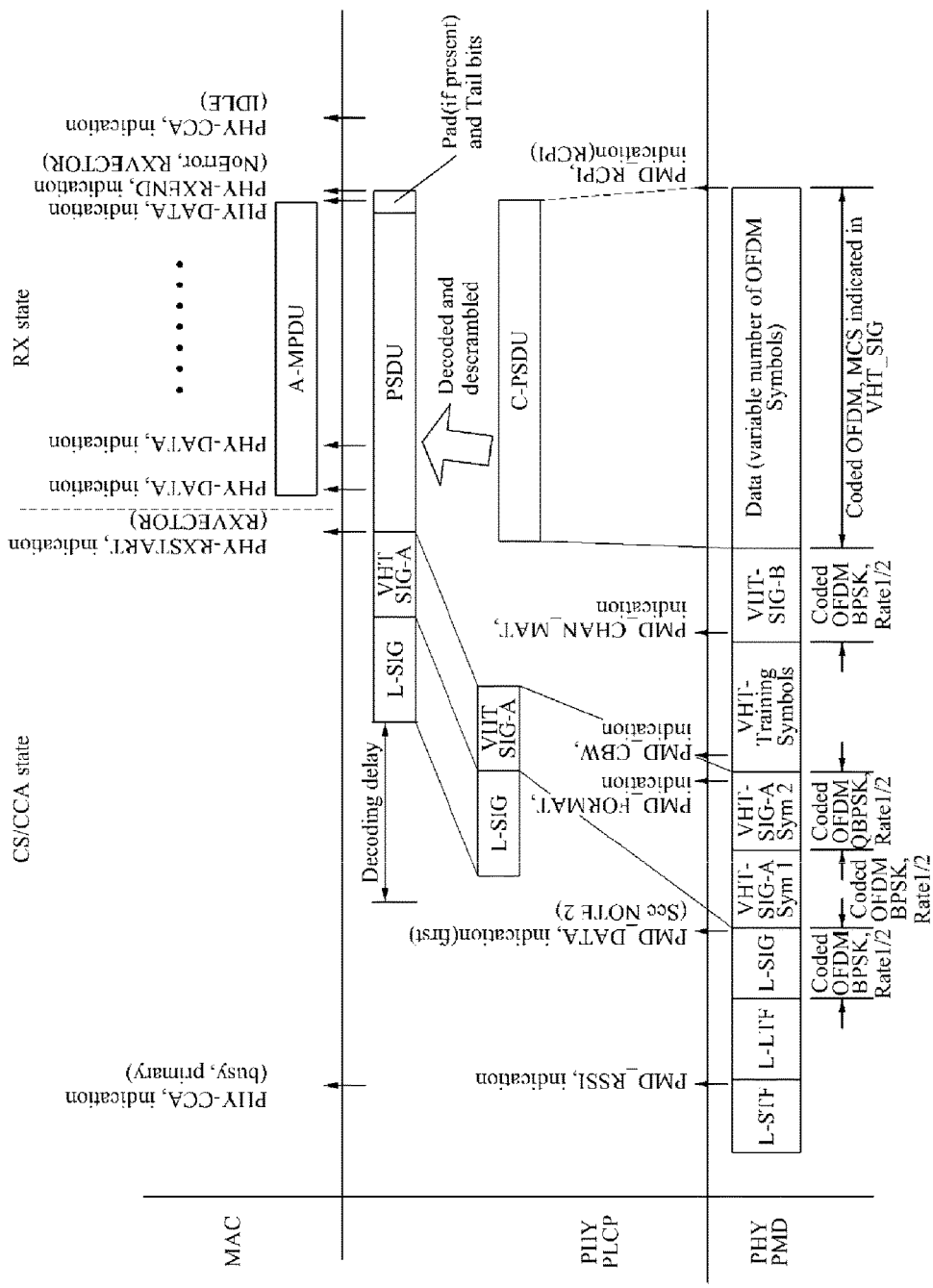
FIG. 18 is a diagram illustrating a configuration of an institute of electrical and electronics engineers (IEEE) 802.11 physical layer, according to an embodiment of the present invention.

FIG. 18 is a diagram illustrating a configuration of an IEEE 802.11 physical layer according to an embodiment of the present invention. The physical layer configuration of IEEE 802.11 may include physical layer management entity (PLME), a physical layer convergence protocol (PLCP) sub layer, and a physical medium dependent (PMD) sub layer. The PLME functions as an interface between MAC layer management entity (MLME) and the physical layer, thereby providing a management function for the physical layer. The PLCP sub layer may transmit a MAC protocol data unit (MPDU) received from a MAC sub layer or transmit a frame received from the PMD sub layer to the MAC sub layer, according to a signal generated by control of the MAC layer between the MAC sub layer and the PMD sub layer. The PMD sub layer, as a PLCP lower layer, supports the physical layer to enable transceiving between two terminals through a wireless medium. The MPDU transmitted by the MAC sub layer is called a physical service data unit (PSDU) in the PLCP sub layer. A-MPDU, which is aggregation of a plurality of MPDUs, may be transmitted.

The PLCP sub layer may add a field including necessary information by a physical layer transceiver during a process of receiving the PSDU from the MAC sub layer and transmitting the PSDU to the PMD sub layer. The added field may include a PLCP preamble, a PLCP header, a tail bit for initiating a convolutional encoder, and the like in the PSDU.

The PLCP preamble may include periodic and repetitive sequences for synchronizing, controlling a gain, or informing of a channel state so that the receiver may successfully recover the PSDU. The PLCP header may include information necessary for recovering the PSDU.

For example, the information may include a packet length, a bandwidth, an MCS, a technology used for transmission, and the like. A data field may include a sequence in which a service field including an initialization sequence for initializing a scrambler and tail bits are bonded and encoded. The data field may be modulated and encoded according to the transmission type included in the PLCP header, and transmitted. The PLCP sub layer of a transmission end may generate a PPDU and transmit the PPDU through the PMD sub layer. A receiving end may receive the PPDU, perform synchronization and gain control by the PLCP preamble, obtain channel state information, and recover by obtaining information necessary for packet recovery through the PLCP header.

IEEE 802.11ac standard supports a bandwidth mode of 20 MHz or 40 MHz that IEEE 802.11n standard supports, and also supports a bandwidth mode of 80 MHz. IEEE 802.11ac standard may transmit signals using non-contiguous two 80 MHz bandwidths simultaneously, that is, non-contiguous 160 MHz, or a contiguous 160 MHz bandwidth.

An AP supporting IEEE 802.11ac standard may transmit packets simultaneously to at least one terminal using a multi user multiple input multiple output (MU-MIMO) transmission technology. In a basic service set of WLAN, an AP may transmit data divided into different spatial streams simultaneously to groups including at least one terminal among terminals associated with the AP. The AP may transmit data to only one terminal by a single user MIMO (SU-MIMO).

When a beam forming technology is supported between an AP and a terminal belonging to a network, transmission may be performed so that a signal gain of a particular single terminal or terminal group is high. A group ID may be allocated to the terminal group to support MU-MIMO transmission. The AP may allocate and distribute the group ID by transmitting a group ID management frame. One terminal may be allocated with a plurality of group IDs.

A WLAN terminal or AP may support different functions depending on a vender that implements a system and manufactures a chip. The standard prescribes not only obligatory items but also optional items. Supported functions may be different according to a version of the implemented standard. For example, whereas convolutional encoding is an obligatory item, low density parity check (LDPC) is an optional item. Beamforming, MU-MIMO, and supporting of a 160 MHz bandwidth may be optional items.

When transmitting the PPDU, the WLAN system may include signal information for the receiving end to correctly recover the PPDU in the header field. Since the signal information is crucial for recovery of the PPDU data, the signal information may be transmitted at a lowest MCS level to be durable against a channel change and a noise.

Very high throughput (VHT) PPDU may be classified into L-STF (Legacy-Short Training Field), L-LTF (Legacy-Long Training Field), L-SIG (Legacy-SIGnal Field), VHT-SIGA (SIGnal Field type A), VHT-STF, VHT-LTF, VHT-SIGB (SIGnal Field type B), and data. High throughput (HT)

PPDU may be classified into L-STF, L-LTF, L-SIG, HT-SIG, HT-STF, HT-LTF, and data. Legacy PPDU may be classified into L-STF, L-LTF, L-SIG, and data.

The L-STF may be used for carrier sensing for sensing that a signal is present in a currently used channel, automatic gain control for suiting a wireless signal input to an antenna for an operation area of an analog circuit and an analog-to-digital converter (ADC), and frequency offset compensation.

The L-LTF may used for frequency offset compensation and symbol synchronization, and for channel response estimation for modulating an L-SIG field and an HT-SIG field or VHT-SIG field. The SNR may be estimated using repetition of the two symbols.

Using the repetitive sequences such as the L-STF and the L-LTF, various channel characteristics including interference, the Doppler effect, delay spread, and the like may be estimated.

Signal fields such as the L-SIG, the HT-SIG, and the VHT-SIG may include control information necessary for demodulation of the PPDU received by the terminal or the AP. The control information may include a packet length, MCS, a bandwidth and channel encoding method, beam forming, space-time block coding (STBC), smoothing, MU-MIMO, and a supported transmission technology such as a short guard interval mode, and the like. The VHT-SIG may be transmitted as being divided into a VHT-SIGA field and a VHT-SIGB field, that is, common control information and dedicated information for a particular MU group. ID information such as a group ID and a PAID may also be included.

The HT-STF or the VHT-STF may be used to increase gain control performance of automatic gain control (AGC). Particularly, when the beam forming is used, additional gain control is indispensable.

The HT-LTF or the VHT-LTF may be used for a terminal or an AP to estimate a channel. Different from legacy standard, since the 11n standard or 11ac standard increases the throughput by increasing a number of used subcarriers, new LTF, in addition to the L-LTF, is defined for data recovery. The VHT-LTF may also include a pilot signal for offset compensation.

The data field may include information on data to be transmitted. The data field may be transmitted including a service field and a tail bit by converting the MPDU of the MAC layer into the PSDU.

The multi-channel power save information of FIG. 17 may be included in a PHY signal field or a MAC header. The multi-channel power save information may be included in not only data or an ACK frame but also in a management frame or a control frame. When the frame is transmitted including power save information to support the power save mode of the embodiment of the present invention, the transmitter and the receiver may perform communication more efficiently. That is, the transmission method to be used may be selected based on multi-channel power save mode information, band use information, and ID information included in the signal information of the received packet. In particular, power saving efficiency may be increased by transmitting a selected channel through the data packet by reducing a used bandwidth for low power transmission.

Figure 19:
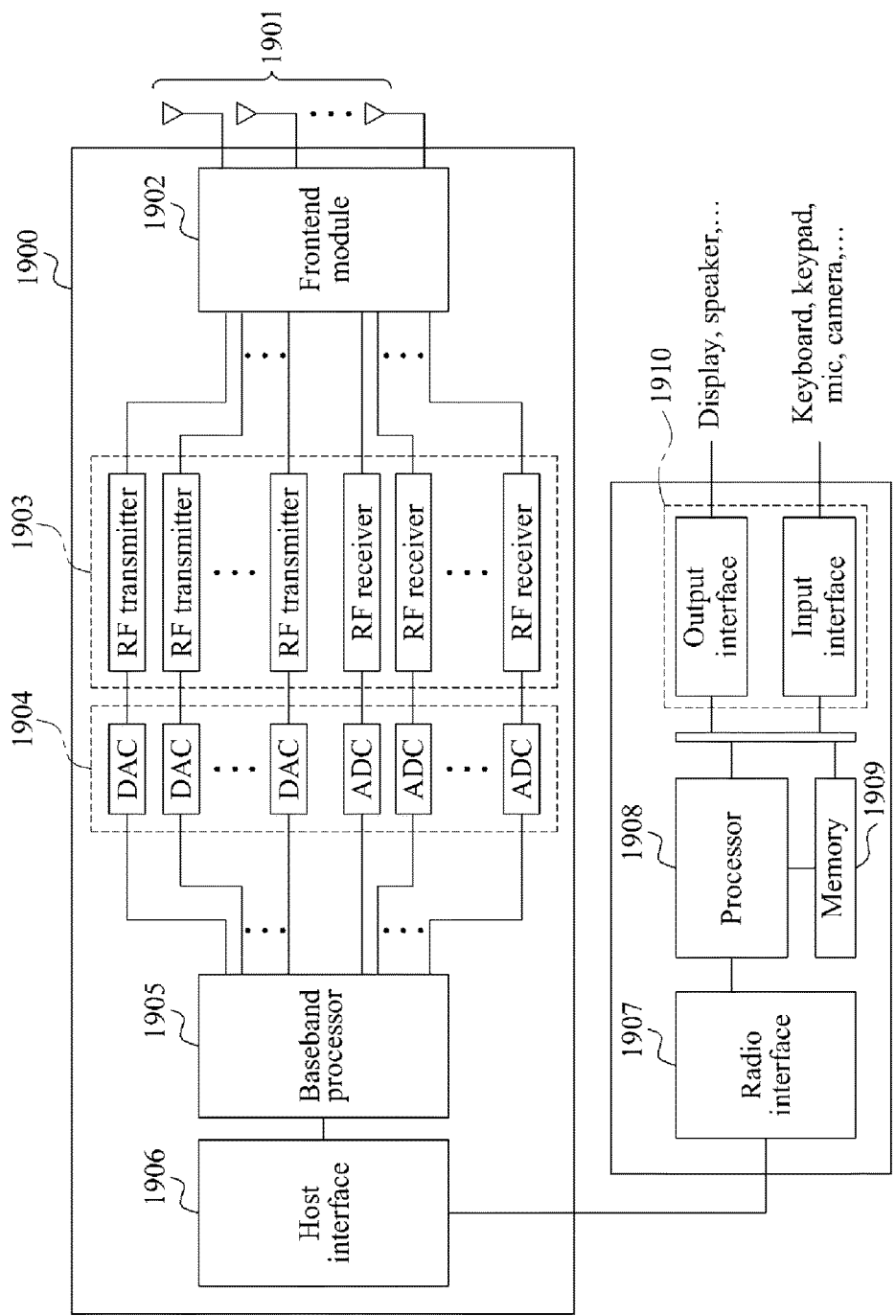
FIG. 19 is a block diagram illustrating a configuration of a multi-channel low power communication system, according to an embodiment of the present invention.

FIG. 19 is a block diagram illustrating a configuration of a multi-channel low power communication system, according to an embodiment of the present invention.

The multi-channel low power communication system 1900 may include a transceiving antenna 1901, a frontend module 1902, a transceiving unit 1903, a DAC/ADC 1904, a baseband processor 1905, and a host interface 1906. A radio interface 1907, a processor 1908, a memory 1909, and an input and output interface 1910 may be further included.

A data packet may be transmitted and received through at least one transceiving antenna 1901. An interface between the transceiving antenna 1901 and the transceiving unit 1903 may be implemented by the frontend module 1902.

The frontend module 1902 may include various external devices not included in the transceiving unit 1903 or devices for performance improvement and function expansion. For example, an external transmission power amplifier or an external receiving low noise amplifier, a switch, and the like may be included.

The transceiving unit 1903 may modulate and transmit the packet to be transmitted, and demodulate the received packet. The ADC and DAC 1904 may convert a signal type between an analog signal and a digital signal.

The baseband processor 1905 may generate a frame corresponding to a transmission frame format, extract information from a received frame, or compensate a distorted signal caused by encoding, decoding, a channel, or an analog device. The radio interface 1907 may function as an interface between a wireless communication modem and the host interface 1906.

The processor 1908 may generate and transmit a PPDU format. Also, the processor 1908 may receive the transmitted PPDU, obtain control information by analyzing field information from a received packet, and recover data using the control information. The processor 1908 or a transceiver may include an application specific integrated circuit (ASIC), a logic circuit, or a data processor.

The memory 1909 may include at least one of a read only memory (ROM), a read access memory (RAM), a flash memory, a memory card, and a storage. An input device with respect to the input and output interface 1910 may include a keyboard, a key pad, a microphone, a camera and the like. An output device may include a display unit, a speaker, and the like.

According to the embodiments of the present invention, a power saving technology of a physical layer for wireless communication is provided. In the embodiments, in a battery-limited wireless communication apparatus supporting a multi-channel, a battery lifetime of a wireless communication apparatus may be increased by controlling a transmission method based on power consumption efficiency, a channel environment, and battery information. Also, in the wireless apparatus supporting a multi-channel, power consumption may be reduced by controlling a transmission method based on power consumption efficiency of a hardware resource, a channel environment, and battery information.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multi-channel low power communication method performed by a receiver, the method comprising:
   receiving, from a transmitter, a data frame header comprising information on a channel bandwidth supported by the transmitter; and
   determining a channel bandwidth for communicating with the transmitter based on the received information on the channel bandwidth of the transmitter so that a power consumption is reduced,
   wherein the information on the channel bandwidth is determined based on a battery state of the transmitter.

2. The multi-channel low power communication method of claim 1, wherein the determining comprises determining a channel bandwidth smaller than a current channel bandwidth as the channel bandwidth for communicating with the transmitter.

3. The multi-channel low power communication method of claim 1, wherein an operation frequency of the receiver is reduced according to the determined channel bandwidth so that the power consumption is reduced.

4. A multi-channel low power communication method performed by a transmitter, the method comprising:
   transmitting, to a receiver, a data frame header comprising information on a channel bandwidth supported by the transmitter; and
   communicating with the receiver in power save mode using a channel bandwidth determined by the receiver,
   wherein the receiver determines the channel bandwidth for communicating with the transmitter based on the received information on the channel bandwidth of the transmitter so that a power consumption is reduced,
   wherein the information on the channel bandwidth is determined based on a battery state of the transmitter.

5. The multi-channel low power communication method of claim 4, wherein the receiver determines a channel bandwidth smaller than a current channel bandwidth as the channel bandwidth for communicating with the transmitter.

6. The multi-channel low power communication method of claim 4, wherein an operation frequency of the receiver is reduced according to the determined channel bandwidth so that the power consumption is reduced.

* * * * *